United States Patent Office 3,344,103
Patented Sept. 26, 1967

3,344,103
SELF CURING SYNTHETIC LATICES
Gorman E. Eilbeck, Elyria, and Robert Y. Garrett, Avon Lake, Ohio, assignors to The B. F. Goodrich Company, New York, N.Y., a corporation of New York
No Drawing. Filed Mar. 8, 1965, Ser. No. 438,096
1 Claim. (Cl. 260—29.7)

ABSTRACT OF THE DISCLOSURE

Stable synthetic latices specially adapted for saturating and impregnating paper and textiles and which do not require addition of curing agents are prepared by interpolymerizing in aqueous emulsion a monomer mixture consisting of 50 to 99.8% by weight of butadiene-1,3, 0.1 to about 10% by weight of acrylic acid or methacrylic acid, 0.1 to about 3% by weight of N-methylol acrylamide or N-methylol methacrylamide and 0 to 49% by weight of styrene or acrylonitrile, in a concentration of about 40 to 60% polymer content in the latex.

---

This application is a continuation-in-part of application Serial No. 839,554 filed September 14, 1959, now abandoned.

The invention relates to stable, aqueous dispersions, or synthetic latices, in which the polymer particles are self-curable, without necessity for addition of curing agents, and which, therefore, are especially adapted for use in applications where a porous material such as paper or textile material is enhanced in properties by treatment with latex and subsequently dried. The stable self-curing latices of this invention are those prepared by the interpolymerization in aqueous emulsion of certain critical proportions of specified monomers as hereinafter defined.

It is known that synthetic latices can be prepared by the interpolymerization in aqueous emulsion of butadiene and syrene or butadiene and acrylonitrile, or butadiene, styrene or acrylonitrile and a third monomer such as acrylic or methacrylic acid, and that such latices are useful in a variety of applications involving latex treatments including the saturation of paper, impregnation of non-woven fabrics and the like. However, in such applications the properties desired from the latex treatment are not achieved unless the polymer in the latex is cured through addition to the latex prior to the treatment of a conventional curing, vulcanizing or cross-linking agent followed by heating to temperatures sufficient to effect the cure.

It is also known that polymers used in paints such as the polymeric acrylates and methacrylates can be improved by interpolymerization of the monomers thereof in organic solvent solutions with a combination of an alkylol acrylamide such as N-methylol acrylamide in an amount of 5% by weight or more of the monomer mixture, and an unsaturated acid such as acrylic acid. However, when it is attempted to copolymerize as much as 5% by weight of N-methylol acrylamide with butadiene and other monomers in aqueous emulsion, coagulation of the aqueous emulsion or dispersion occurs and a stable latex is not obtained.

We have discovered novel synthetic latices which are stable against coagulation, which are highly suitable for use in latex applications such as saturation of paper and as a binder for non-woven fabrics and which do not require the addition of curing agents in the application thereof. These novel latices are aqueous emulsion interpolymerization products of a monomer mixture of (1) from about 50 to 99.8% by weight of butadiene-1,3, (2) from about 0 to 49.8% by weight of styrene or acrylonitrile, (3) from about 0.1 to about 3% by weight of an N-alkylol amide of an alpha,beta-olefinically unsaturated monocarboxylic acid, and (4) from 0.1 to about 10% of an alpha,beta-olefinically unsaturated monocarboxylic acid. In the above-described proportions it is to be understood that when a maximum amount of one monomer is employed that the relative proportions of the remaining monomers must be adjusted so that the combined weight percentage of monomers used in any single polymer will total substantially 100%. The proportion of the N-alkylol amide is critical in order to obtain a latex and the proportions of the other monomers are critical to obtain latices of the properties desired.

The N-alkylol amides of alpha-beta-olefinically unsaturated carboxylic acids used in the monomer mixture generally have from 4 to 10 carbon atoms and include N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-methylol amides of the vinyl aromatic acids such as N-methylol-p-vinyl benzamide, and the like and others. The preferred monomers of the N-alkylol amide type because of their ready availability and relatively low cost are N-methylol acrylamide and N-methylol methacrylamide.

The alpha,beta-olefinically unsaturated carboxylic acids useful in this invention are those having from 3 to 6 carbon atoms, representative members of which include acrylic acid, methacrylic acid, ethacrylic acid, alpha-chloro acrylic acid, maleic acid, fumaric acid, citraconic acid, sorbic acid and the like and anhydrides thereof. The preferred monomers of this type are acrylic acid, methacrylic acid and maleic anhydride. The most preferred are the alpha,beta-olefinically unsaturated monocarboxylic acids and particularly acrylic and methacrylic acids.

The latices of this invention are prepared by polymerization in an aqueous medium and contain in the range of from about 40 to 60% total solids. The aqueous medium may be emulsifier-free or it may contain an emulsifier. Suitable emulsifiers include sulfates and sulfonates such as sodium lauryl sulfate, the alkali metal salts of sulfonated petroleum or paraffin oils, the sodium salts of aromatic sulfonic acids such as the sodium salt of naphthalene sulfonic acid, the sodium salts of dodecane-1-sulfonic acid, octadecane-1-sulfonic acid, etc.; aralkyl sulfonates such as sodium isopropyl benzene sulfonate, sodium dodecyl benzene sulfonate and sodium isobutyl naphthalene sulfonate; alkali metal salts of sulfonated dicarboxylic acid esters and amides such as sodium dioctyl sulfosuccinate, sodium-N-octa-decyl sulfosuccinamate and the like, and others. The so-called cationic emulsifiers such as the salts of strong inorganic acids and organic bases containing long carbon chains, for example, lauryl amine hydrochloride, the hydrochloride of diethylaminoethyl-decylamine, trimethyl cetyl ammonium bromide, dodecyl trimethyl ammonium bromide, the diethylcyclohexylamine salt of cetyl sulfuric ester, and others also may be used. Preferred, however, are the alkali metal salts of aromatic sulfonic acids and the sodium salts of aralkyl sulfonates. In addition to the above and other polar or ionic emulsifiers, still other materials which may be used, singly or in combination with one or more of the above-mentioned types of emulsifiers, include the so-called "non-ionic" emulsifiers such as the polyether alcohols prepared by condensing ethylene oxide with higher alcohols, the fatty alkylol-amine condensates, the diglycol esters of lauric, oleic and stearic acids, and others. It is often desirable to add post-polymerization emulsifiers to the latices embodied herein for improved latex stability.

The catalyst, required for satisfactory polymerization rate, may be any of those commonly employed for the polymerization of butadiene hydrocarbons including the various peroxygen compounds such as hydrogen peroxide, benzoyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate and others.

Particularly preferred are the water-soluble peroxygen compounds such as hydrogen peroxide and the sodium, potassium and ammonium persulfates, the water-soluble oxidation-reduction or "redox" types of catalysts, and the heavy metal activated, water-soluble peroxygen and redox catalysts. Included in this preferred list are the water-soluble persulfates; the combination of one of the water-soluble peroxygen compounds such as potassium persulfate with a reducing substance such as a polyhydroxy phenol, an oxidizable sulfur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a diazomercapto compound and a water-soluble ferricyanide compound and others. Heavy metal ions which greatly activate potassium persulfate catalyzed and the redox catalyzed polymerization medium include those of silver, copper(ic), iron, cobalt, nickel and others. The preferred range of catalyst as above-defined is from about 0.01 to about 3 parts by weight per one hundred parts by weight of monomers.

It is generally desirable to incorporate from 0.1 to 5% by weight of an antioxidant or a mixture of antioxidants such as the hindered phenols and diaryl amines into the latex.

While the polymerization may be carried out in the presence of air, the rate of reaction is ordinarily faster in the absence of oxygen and hence polymerization in an evacuated vessel, at reflux, or under an inert atmosphere such as nitrogen is preferred. The temperature at which the polymerization is carried out is not critical, it may be varied widely from −30° C. to 100° C. or higher, though best results are generally obtained at a temperature of from about 0° C. to about 70° C. While the pH of the polymerization system is not critical, it is preferred that a pH of 7 or below be employed during the polymerization reaction. The polymer latex may subsequently be adjusted to any desired pH.

Other polymerization techniques and practices conventionally employed in the preparation of butadiene-styrene and butadiene-acrylonitrile synthetic latices may also be used in polymerizing the monomer mixtures herein described. For example, the use of mercaptan modifiers in the reaction mixture is often desirable. Modifiers such as the primary, secondary and tertiary aliphatic mercaptans containing from 4 to 16 carbon atoms are particularly useful in this invention. Still other substances which desirably may be incorporated into the reaction medium include buffers, electrolyte salts, carbon black and others in a manner well understood by those in the art. Moreover, the polymerization may be terminated, as by addition of a polymerization inhibitor such as a hydroquinone or phenyl beta-naphthylamine, before conversion of the monomers to polymer is complete. The higher the conversion, everything else being equal, the higher the gel or insoluble content of the dispersed polymer particles. Latices prepared by stopping the reaction at 50 to 90% conversion have dispersed polymer particles which are more plastic and more soluble and are generally preferred.

While the latices of this invention are especially adapted to be used in latex form, the polymer particles present therein may be isolated from the latex by coagulation with the conventional alcohol or salt-acid coagulants or they may be isolated by freeze agglomeration. In general the latices of the polymers of this invention are useful for saturation, coating, impregnating and dipping operations. The latex may be used, per se, it may be diluted to lower solids content and it may be blended with latices and dispersions of other rubber and plastic materials. It is often desirable to blend with the latex thickeners and bodying agents which improve flow properties in subsequent coating and dipping operations. Well known thickening agents and stabilizers such as casein, carboxymethyl cellulose, methyl cellulose and polyacrylic acid salts may be used without departing from the spirit of this invention.

The latices of this invention are especially useful in leather finishing, non-woven fabric binding, impregnation and coating of textile fabrics, impregnating and coating paper, in adhesive compositions, in printing pastes, in water-base paint formulations and the like.

It is to be understood that the latices of this invention can also be prepared by employing amides of alpha, beta-olefinically unsaturated carboxylic acids in place of their N-alkylol derivatives disclosed above, providing the resulting latices are reacted with an aldehyde such as formaldehyde or formalin to form the N-alkylol derivative of the amide in situ.

In the following illustrative examples the quantities of ingredients used are expressed in parts by weight unless otherwise indicated.

Example 1

An interpolymer latex (A) of butadiene, acrylonitrile, methacrylic acid and N-methylol acrylamide was prepared in a batch charge at about 45° C. in an essentially oxygen-free atmosphere of nitrogen from the following recipe:

|  | A |
|---|---|
| Butadiene | 66 |
| Acrylonitrile | 30 |
| Methacrylic acid | 3 |
| N-methylol acrylamide | 1 |
| Water | 100 |
| Sodium dodecyl benzene sulfonate | 2.5 |
| Sodium salt of naphthalene sulfonic acid | 1.0 |
| Tertiary $C_{12}$ mercaptan | 0.28 |
| Ammonium persulfate | 0.3 |

The polymerization was stopped at 90–100% conversion with di-tertiary amyl hydroquinone and the resulting latex was stabilized with di-tertiary butyl p-cresol. In a similar manner other interpolymers (B–M) were prepared from the monomeric proportions listed below.

|  | B | C | D | E | F | G | H | I | J | K | L | M |
|---|---|---|---|---|---|---|---|---|---|---|---|---|
| Butadiene | 66.28 | 66 | 66 | 65 | 51.25 | 51.25 | 71 | 97 | 74.8 | 100 | 70.5 | 99.8 |
| Acrylonitrile | 30 | 30 | 30 | 30 |  |  | 25 |  | 25 |  | 26.5 |  |
| Styrene |  |  |  |  | 39 | 45 |  |  |  |  |  |  |
| Acrylic Acid |  |  |  |  | 1.5 | 1.5 | 1.5 | 1.2 |  |  | 1.2 |  |
| Methacrylic Acid | 3 | 3 | 3 | 3 | 9 | 1.5 | 1.5 |  | 0.1 |  |  | 0.1 |
| N-Methylol Acrylamide |  |  |  | 1 | 2 | 0.75 | 0.75 | 1.0 | 1.8 | 0.1 | 1.8 | 0.1 |
| N-Methylol Methacrylamide | 0.72 | 1 |  |  |  |  |  |  |  |  |  |  |

The polymer latices A–M of this example were used in paper saturation and as non-woven fabric binders in Example II through V below.

When an attempt was made to prepare an interpolymer of 45 parts butadiene, 45 parts of styrene, 2 parts acrylic acid and 7 parts of N-methylol acrylamide the resulting latex coagulated on cooling after the polymerization.

Example II

The polymer latices used in this example were first reduced to 20% total solids by dilution with water. Each latex was then padded onto a non-woven fleece composed of 50% nylon and 50% of a cotton-rayon mixture. The treated webs were then dried on a photoprint drier followed by a 3 minute cure at 300° F. in a circulating air oven. The bound webs were then tested for percent polymer pickup, tensile, elongation, solvent resistance, soil resistance, heat and light aging properties and wrinkle recovery. The tensile and elongation, which are expressed in pounds per square inch, were determined both in the machine direction and cross machine direction. The solvent resistance is expressed as the tensile in pounds per square inch after the bound web had been soaked in perchloroethylene for 20 minutes. The soiling is expressed as the photovolt reflectance after the bound web had been immersed in a standard soiling solution for 20 minutes at 140° F. followed by 10 minutes of rinsing in clear water at 140° F. The light aging is expressed as the photovolt reflectance of the bound web after it had been aged for 20 hours in the fadeometer. The heat aging test values are photovolt reflectances of the sample after 24 hours aging at 212° F. The Monsanto wrinkle recovery is expressed in degrees with a maximum of 180° possible for a sample which recovers fully.

|  | Latex A |
|---|---|
| Percent Pickup | 88 |
| Tensile: |  |
|   Machine Direction | 6.9 |
|   Cross Machine Direction | 20.0 |
| Percent Elongation |  |
|   Machine Direction | 58 |
|   Cross Machine Direction | 34 |
| Solvent Resistance: |  |
|   Machine Direction | 2.8 |
|   Cross Machine Direction | 11.7 |
| Soiling | 67 |
| Light Aging | 48 |
| Heat Aging | 74 |
| Monsanto Wrinkle Recovery: |  |
|   Machine Direction | 158 |
|   Cross Machine Direction | 166 |

Example III

The latices employed in this example were first diluted to 35% total solids with water. An 11 mil Munising flat paper which had previously been conditioned at 72° F. and 65% relative humidity was saturated in each case by floating the paper on top of the latex bath. The papers, after being coated on both sides in the above-described manner, were cured at 212° F. for 10 minutes and then at 325° F. for 3 minutes. The resulting coated papers were conditioned at 72° F. for 16 hours prior to testing. The control latex is an interpolymer of 67 parts butadiene, 30 parts acrylonitrile and 3 parts methacrylic acid. Polymer E is described in Example I.

|  | E | Control |
|---|---|---|
| Tensile, p.s.i.: |  |  |
|   Dry | 36.2 | 31.0 |
|   Wet | 37.2 | 11.6 |
| Percent Elongation | 14.0 | 15.0 |
| Edge Tear, p.s.i. | 70.3 | 61.0 |
| Internal Bond, oz./in | 45.6 | 37.6 |

Example IV

The procedure used was that described in Example II except that a curing cycle of 1 hour at 212° F. was employed. The control latex is an interpolymer of 67 parts butadiene, 30 parts acrylonitrile and 3 parts methacrylic acid prepared by the procedure described in Example I. Latices D and E are described in Example I.

|  | Control | D | E |
|---|---|---|---|
| Tensile, p.s.i.: |  |  |  |
|   Machine Direction | 6.9 | 6.7 | 7.9 |
|   Cross Machine Direction | 19.1 | 20.0 | 22.1 |
| Percent Elongation: |  |  |  |
|   Machine Direction | 100 | 70 | 72 |
|   Cross Machine Direction | 58 | 50 | 49 |
| Monsanto Wrinkle Recovery: |  |  |  |
|   Machine Direction | 131 | 154 | 156 |
|   Cross Machine Direction | 140 | 156 | 159 |
| Discoloration, Photovolt Reflectance: |  |  |  |
|   Original | 83 | 83 | 83 |
|   Heat | 74 | 75 | 75 |
|   Light | 57 | 57 | 57 |
|   Soiling | 48 | 67 | 68 |

Example V

The procedure described in Example III was followed employing 12″ x 16″ sheets of 11 mil flat Munising paper and 15% total solids latices. The paper was floated for 10 seconds on each side in the latex bath. The sheets were then cured for 3 minutes at 325° F. followed by a conditioning period of 16 hours at 65% relative humidity and 72° F. before testing. Control 1 is an interpolymer of 52 parts butadiene, 39 parts styrene and 9 parts methacrylic acid; Control 2 is an interpolymer of 52 parts butadiene and 48 parts styrene and K is a polybutadiene control; Controls 1 and 2 were prepared by the procedure described in Example I. Latices F, G, H, I, J, K, L, M and N are described in Example I.

|  | Control 1 | Control 2 | F | G | H | I | J | K | L | M |
|---|---|---|---|---|---|---|---|---|---|---|
| Tensile, p.s.i.: |  |  |  |  |  |  |  |  |  |  |
|   Dry | 34.5 | 40.4 | 47.8 | 45.2 | 47.8 | 21.0 | 17.4 | 16.1 | 40.6 | 15.7 |
|   Wet | 26.9 | 32.7 | 53.0 | 42.6 | 51.5 | 26.2 | 20.3 | 15.4 | 56.6 | 19.4 |
| Percent Elongation | 12.0 | 10.3 | 9.5 | 8.2 | 10 | 7.2 | 9.0 | 3.5 | 11.0 | 5.0 |
| Edge Tear, p.s.i. | 56.0 | 47.2 | 57.0 | 45.0 | 63 | 23 | 28.0 | 7.0 | 54.2 | 12.2 |
| Internal Bond, oz./in | 9.6 | 12.4 | 18.0 | 22.4 | 34.8 | 8.0 | 16.0 | 3.2 | 26.4 | 6.4 |
| Percent Polymer Pickup | 56.0 | 51.4 | 56.8 | 47.7 | 44.2 | 48 | 58.2 | 43.5 | 43.3 | 51.0 |

Example VI

A series of aqueous interpolymer latices was prepared by polymerization of monomer mixtures in aqueous emulsion each emulsion polymerization recipe being as follows:

| Ingredients | Parts |
|---|---|
| Water | 140 |
| Monomers mixture | 100 |
| Sulfuric acid (electrolyte, pH modifier) | 0.02 |
| Potassium chloride (Samples 1–5 only) (electrolyte) | 0.2 |
| Sodium sulfate (Samples 6–10 only) (electrolyte) | 0.2 |
| Tertiary dodecyl mercaptan (molecular weight modifier) | 0.6 |
| Sodium dodecylbenzene sulfonate (emulsifier) | 4.5 |
| Sodium naphthalene sulfonate (emulsifier) | 0.5 |
| Potassium persulfate (catalyst) | 0.3 |
| Sodium hydrosulfite (catalyst aid) | 0.03 |
| Tetrasodium salt of ethylene diamine-tetraacetic acid (chelating agent) | 0.02 |

The monomers mixtures were composed of the following components and proportions in parts by weight.

| Monomer | Sample Number | | | | | | | | | |
|---|---|---|---|---|---|---|---|---|---|---|
| | 1 | 2 | 3 | 4 | 5 | 6 | 7 | 8 | 9 | 10 |
| Butadiene | 67 | 67 | 67 | 67 | 67 | 67 | 67 | 67 | 67 | 67 |
| Styrene | 28.8 | 26.8 | 25.8 | 24.8 | 21.8 | | | | | |
| Acrylonitrile | | | | | | 28.8 | 26.8 | 25.8 | 24.8 | 21.8 |
| Acrylic acid | 1.2 | 1.2 | 1.2 | 1.2 | 1.2 | 1.2 | 1.2 | 1.2 | 1.2 | 1.2 |
| N-methylol acrylamide | 3 | 5 | 6 | 7 | 10 | 3 | 5 | 6 | 7 | 10 |

The emulsion polymerizations were carried out at a pH of around 2.5 and within a temperature range of from about 35° C. to 50° C. for 12 to 15 hours to give conversions of monomer to polymer of from 90% to 93%. The polymerizations were terminated by the addition thereto of 0.5 part of a shortstop agent (ditertiary amyl hydroquinone).

Samples 1 and 6 (aqueous latices of interpolymers containing 3% of N-methylol acrylamide) were fluid, stable latices which contained negligible coagulum and were deemed suitable for such uses as non-woven fabric binding, impregnation and coating of textile fabrics and paper, leather finishing and the like. All other samples were unsuitable for such uses; Samples 2, 3, 4, 7, 8 and 9 (5% to 7% N-methylol acrylamide) were unsatisfactory latices containing excessive amounts of coagulum and were relatively much more viscous; Samples 5 and 10 (10% N-methylol acrylamide) were solid masses of coagulum without any latex characteristics.

The aforesaid tests demonstrate that the amount of N-methylol acrylamide which can be interpolymerized in aqueous emulsion with other monomers consisting of 50% to 99.8% butadiene-1,3, 0 to 49.8% styrene or acrylonitrile, and 0.1 to 10% acrylic or methacrylic acid is limited to a maximum of about 3% if a stable fluid useful aqueous latex is the desired product.

We claim:

An aqueous synthetic latex inherently stable against coagulation at normal temperature and being especially adapted for saturation and impregnation of paper and textiles without addition thereto of curing agents, having about 40 to 60 percent total solids content, and prepared by interpolymerizing in aqueous emulsion a monomer mixture consisting of the following ingredients, totaling 100 percent of said mixture:
(1) 50 to 99.8 percent by weight of butadiene-1,3,
(2) 0 to 49.8 percent by weight of a monomer copolymerizable with butadiene-1,3 and selected from the group consisting of styrene and acrylonitrile,
(3) 0.1 to about 10 percent by weight of a carboxylic monomer selected from the group consisting of acrylic acid and methacrylic acid, and
(4) 0.1 to about 3 percent by weight of an unsaturated amide selected from the group consisting of N-methylol acrylamide and N-methylol methacrylamide.

References Cited

UNITED STATES PATENTS

| | | | |
|---|---|---|---|
| 2,959,821 | 11/1960 | Kolb | 260—29.7 |
| 2,984,588 | 5/1961 | Granlich et al. | 260—80.7 |
| 3,037,963 | 6/1962 | Christenson | 260—80.7 |
| 3,231,533 | 1/1966 | Garrett et al. | 260—80.5 |
| 3,240,740 | 3/1966 | Knappet et al. | 260—29.6 |

MURRAY TILLMAN, *Primary Examiner.*

J. T. GOOLKASIAN, *Assistant Examiner.*